May 21, 1963
B. BERGHAUS
3,090,745
METHOD OF AND APPARATUS FOR PRODUCING
REACTIONS UNDER ELECTRICAL ACTION
Filed May 18, 1959
4 Sheets-Sheet 2

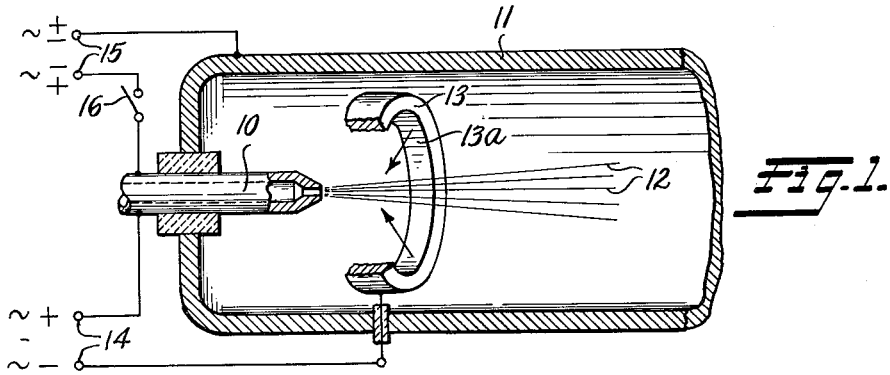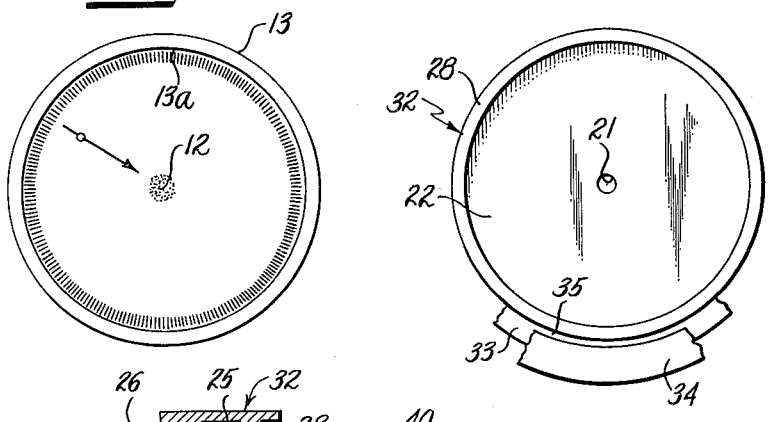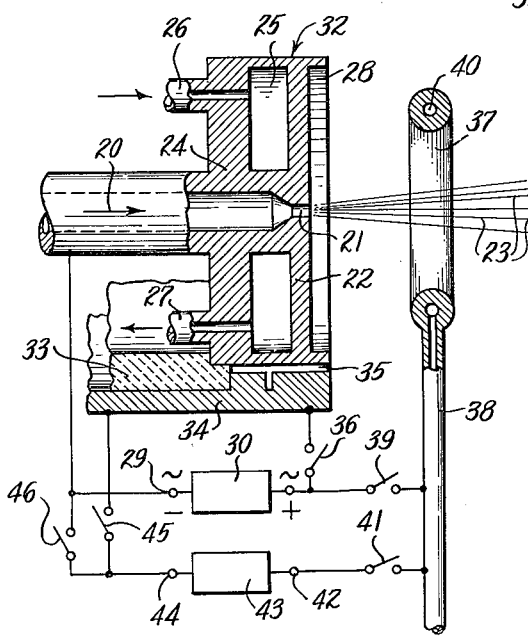

INVENTOR
Bernhard Berghaus

BY Bacon & Thomas
ATTORNEYS

May 21, 1963 B. BERGHAUS 3,090,745
METHOD OF AND APPARATUS FOR PRODUCING
REACTIONS UNDER ELECTRICAL ACTION
Filed May 18, 1959 4 Sheets-Sheet 3
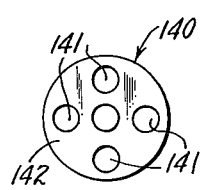
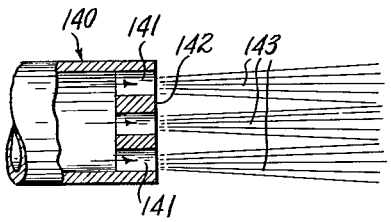
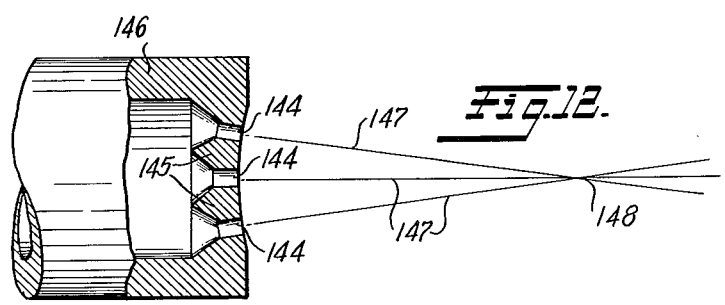
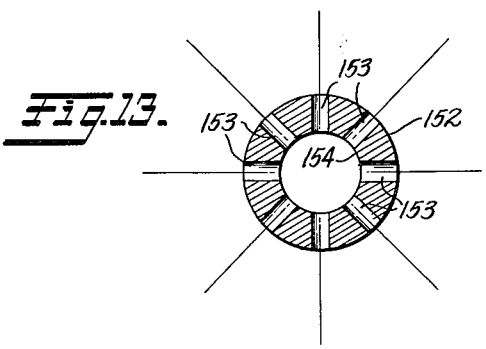
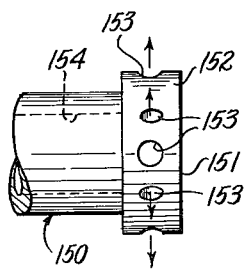
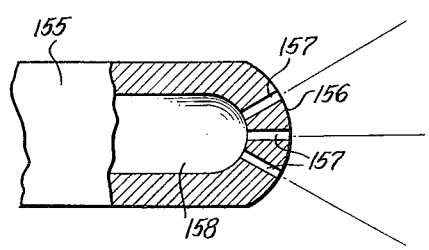
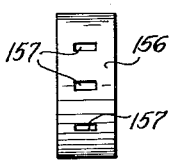
INVENTOR
*Bernhard Berghaus*
BY *Bacon & Thomas*
ATTORNEYS

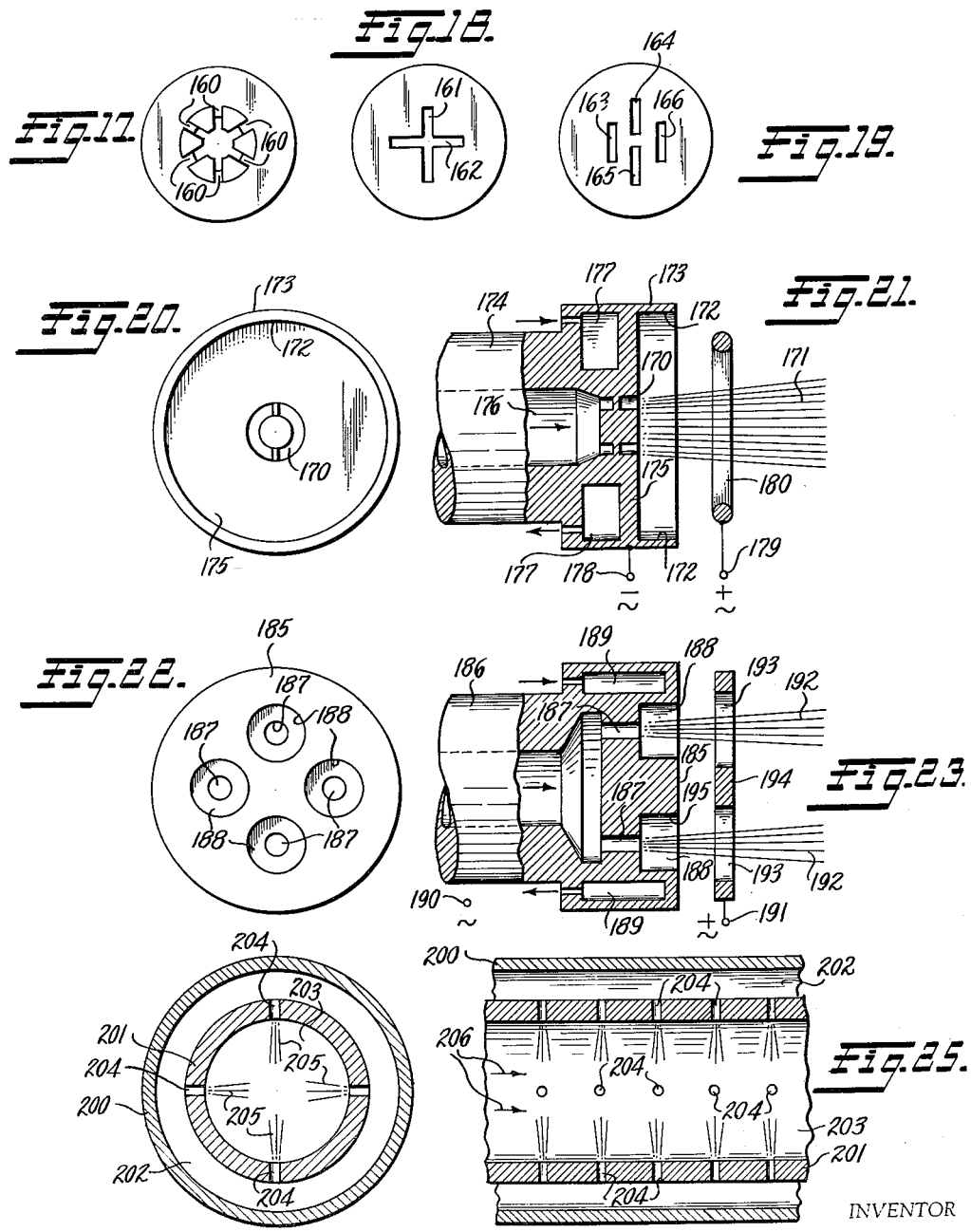

United States Patent Office 3,090,745
Patented May 21, 1963

3,090,745
METHOD OF AND APPARATUS FOR PRODUCING REACTIONS UNDER ELECTRICAL ACTION
Bernhard Berghaus, Grand Hotel Dolder, Zurich, Switzerland
Filed May 18, 1959, Ser. No. 813,760
10 Claims. (Cl. 204—312)

This invention relates to a process of and an apparatus for carrying out reactions on gaseous, vaporous or finely dispersed liquid and solid substances when being passed through the reaction space under electrical action.

Various processes and apparatus of this kind are already known in which a glow discharge is produced in a suitable recipient between live electrodes, this glow discharge acting upon a gas current and producing reactions therein. In the known processes of this kind, the electric field acts, for example, through layers of insulation, it being thus possible to choose the pressure in the reaction space as desired, but in which, for thermal reasons, the energetic current density of the glow discharge, which is mostly produced on the surface of the insulating layers, cannot be increased above relatively low values. On the other hand, in the case of discharge receptacles in which the electrodes to which the voltage is applied lie freely opposite one another, the glow discharge which is produced follows the known laws, according to which an increase in the energy of the glow discharge necessarily produces a pressure increase in the discharge container, which, in its turn, results in a gradual concentration of the energetic discharge upon the glow skin covering the parts to which a voltage is applied. Although the energy transformation can thus be greatly increased with the increase of the pressure—if the glow discharge is prevented from passing into an arc discharge—the energy is freed only in the immediate vicinity of material surfaces. When reactions are performed on gaseous, vaporous or finely dispersed substances, the presence of such surfaces participating in the process is frequently undesirable; however, energetic glow discharges are not known to take place in the free space between the electrodes. It was suggested to avoid these difficulties by using high-frequency gas discharges, but this process has not been successful either.

A further known process for the production of gas reactions in a narrow gap between energized metal partitions turned out to be unsuitable, inasmuch as, owing to the high current resistance, the sojourn time of the reacting substances cannot be sufficiently influenced.

A method free from the above described disadvantages is already disclosed in Patent No. 2,837,654. The characteristic feature thereof is that a non-homogenous distribution of the pressure is produced in the reaction space and that a zone of higher pressure is created. The energy of the electrical gas discharge is largely concentrated on this zone. The starting substances flow through this zone, and the supplied substances remain in the said zone for a predetermined time.

This invention relates to a further development of the aforementioned method and is characterized by the fact that the reacting substances are supplied into the reaction space in the form of at least one jet, and flow through a portion of the space which is penetrated, from the periphery, by charge carriers directed to the jet.

This invention further relates to a device for the performance of this process consisting of a reaction vessel with at least one nozzle-like supply member for reacting substances, at least one outlet connection for reaction products and at least one insulated electrode introduced into the reaction receptacle. The characteristic feature thereof consists in at least one bent metal surface, connected to an insulated current inlet member, arranged along the elongated nozzle axis and at least partly surrounding the same.

Various embodiments of the invention are hereinafter described with reference to FIGURES 1 to 23 of the accompanying drawings, in which:

FIGS. 1 and 2 are respectively a perspective side view, partly in section, and a front view of the jet, according to this invention;

FIGS. 3 and 4 are respectively a longitudinal section and a front view of a first embodiment of a device for application of the process according to this invention;

FIGS. 10 and 11 represent respectively a horizontal projection and a longitudinal section of a multiple nozzle with parallel jet axes;

FIG. 12 is a longitudinal section of a multiple nozzle with intersecting jet axes;

FIGS. 13 and 14 are, respectively, a transverse section and an elevation of a multiple nozzle with radially divergent jets;

FIGS. 15 and 16 show respectively a longitudinal section and a front view of another multiple nozzle with divergent jet axes.

FIGS. 17, 18 and 19 are front views of a multiple nozzle with different cross-sections of the nozzle openings;

FIGS. 20 and 21 show, a front end view and a longitudinal section of two multiple nozzle with coaxial annular surfaces;

FIGS. 22 and 23 show respectively a front end view and a longitudinal section of another embodiment with a multiple nozzle, and FIGS. 24 and 25 show respectively a transverse and a horizontal section through a further embodiment.

Figure 5:
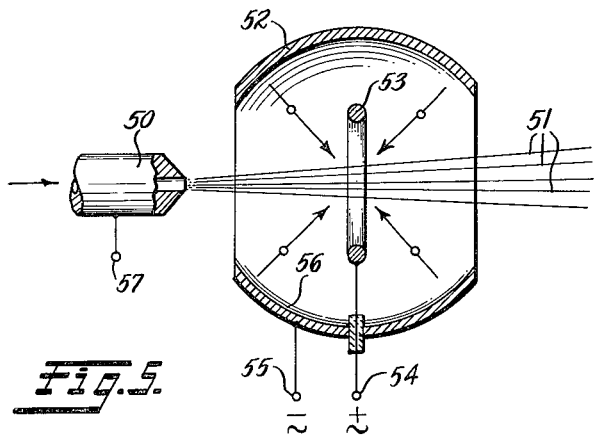
FIGS. 5 through 7 show another longitudinal section each of an embodiment.

With this method, the gaseous and vaporous reacting substances or the finely dispersed reacting substances added to the carrier gas current by means of a nozzle-like supply member (indicated at 10 in FIG. 1), are introduced into the reaction recipient 11 as jet 12. To enable a jet to be formed, the gas leaving the nozzle-mouth must have a higher pressure than that in the space in the reaction receptacle 11. Provided that the said difference of pressure is large enough, such a jet can be obtained in a reaction space with an underpressure of 0.5 to 500 mm. Hg, as well as in a space of increased pressure up to 10 g.a. (gauge atmosphere) and even more.

After leaving the mouth of the nozzle 10, the jet flows through a space portion which is held under electrical action created by the metal ring 13, the metallic nozzle 10 and the D.C. or A.C. voltage applied to the terminals 14. If a negative voltage is at least periodically applied to the ring 13, it is well known that an electric glow discharge can be obtained on its surface and in particular on the inside 13a if the applied voltage exceeds the ignition voltage of the gas surrounding the ring 13. After the ignition has taken place, the operating voltage may be under or above the ignition voltage.

With the appearance of a glow discharge on the inside 13a of the ring 13, so-called cathode rays consisting of electrons are generated. Directed radially from the glow seam and/or from the inside 13a to the centre on to the jet 12, they penetrate the whole space within the metal ring 13. If the ring 13 or its inner surface 13a surrounds the jet path concentrically, the electrons emerging from the inside 13a concentrate approximately in the jet axis so that a high electron current density occurs in the jet.

It is advisable to cool the ring 13, in particular if an intense current of electrons is to be generated, for instance by means of a ring channel, thus enabling the cooling medium flow to pass through the ring. Experimental research reveals that, with sufficiently intensive cooling, the location of the top energetic output is carried away from the metal surface 13a into the space in front of it which, in this case, is particularly advantageous. But such an effect seems to presuppose a certain minimum output. Increased currents of electrons necessitate an increased density of ion current on the ring inside 13a for which purpose the gas pressure in the proximity of the ring 13 is preferably increased, for instance, from 40 to 100 mm. Hg. Yet the pressure must not be increased to such an extent that the velocity of electrons is considerably reduced or that the electrons are absorbed before they reach the jet. If, however, there is no danger in this respect, the ring diameter and, therefore, also the inside 13a may even be enlarged, which results in a corresponding increase of the gas jet 12 penetrating the current of electrons.

The bent metal surface, here the cylindrical inside 13a of the ring 13, must at least periodically carry a cathodic potential, i.e., be connected, via the terminals 14, with the negative pole of a direct current source or with an alternating current source. The nozzle should preferably carry, relatively to the ring 13, a voltage favoring the glow discharge on the inside 13a. But also another counter-electrode may be provided for the ring 13. Furthermore, the nozzle 10 may be connected, via the terminals 15 and the switch 16, to another voltage source whose other pole, for instance, is connected with the metallic wall of the reaction vessel 11. This voltage may be either a direct current or an alternating current voltage and may be bigger or smaller than the voltage applied to the ring 13, but it should not be less than 100 v. and not more than 2000 v. When using alternating voltage, voltages of medium frequency, such as up to 1000 cycles, may also be utilized.

A device for the application of this process is shown in FIGS. 3 and 4, where the reacting substances enter the reaction space as the jet 23—in the direction of the arrow 20—through a nozzle-like opening 21 in a metal plate 22. The metal plate 22 represents the front surface of a metallic body 24 turned towards the reaction space. By means of the hollow space 25 adjacent to the edge of the metal body, the metal plate 22 may be cooled intensively by a cooling medium current via the inlet 26 and the outlet 27. In a coaxial position to the nozzle opening 21 lies an edge or flange 28 serving as the outer end of the metal plate 22. The metal body 24 is connected to the at least periodically negative pole 29 of the voltage source 30.

The cylindrical wall surface 32 of the metal body 24, which is axially symmetrical, is surrounded by an insulating sleeve 33 which, together with the metallic sleeve 34 rests on the metal body 24 with whose sleeve surface 32 it forms an annular protective gap 35 open to the reaction space. As far as the width, depth and structure are concerned, this protective gap may be designed according to Swiss Patents Nos. 291,029 and 291,333. This metal sleeve 34 is connected, via the switch 36, to the other pole 31 of the voltage source 30. If desired, the metal sleeve 34 may also be designed with a cooling device, for instance by providing internal hollow spaces or by mounting cooling spirals on the outside.

Arranged in front of the metal plate 22 in the reaction space is a counter-electrode with an aperture for the jet 23 in a coaxial position to the direction of the jet which may be designed, for instance, as indicated in FIG. 3, as a concentrical jet surrounding metal ring 37 at the support 38. This counter-electrode is connected, via the switch 39, with the pole 31 of the voltage source 30 and may, therefore, carry the same voltages as applied to the metal sleeve 34. The counter-electrode may be coolable, similar to the metal ring 37, by means of an in- and outflow of a cooling medium current, via the metal support 38, through the hollow space 40. If desired, the counter-electrode may also be connected, via the switch 41, to one pole 42 of a direct current or alternative current source 43, whose other pole 44 may be connected at will, via the switch 45, to the metal sleeve 34 or, via the switch 46, to the metal body 24.

When this device is in operation, for instance with switches 36 and 39 closed, the jet 23, emitted through the nozzle mouth 21, stays, on the one hand, under the action of the electric field between the at least periodically negative metal plate 22 and the at least periodically positive counter-electrode 37. On the other hand, however, a glow skin is formed on the outside of the metal edge 28 producing a current of electrons concentrically along the jet, thus penetrating the jet. The existence of the protective gap 35 prevents, in the known manner, the spreading and the penetration respectively of the glow skin produced at the edge 28.

In order to facilitate the operation, in particular with increased pressures in the reaction space of above 20 mm. Hg, it is advantageous to have the counter-electrode formed slidable along the jet axis. An initial process may then be carried out; at the beginning, the counter-electrode 37 is approached to the nozzle mouth 21, the distance being then increased only when the ignition of the glow discharge has taken place. For expediency, the pressure in the reaction space is also reduced at the beginning of the initial process, e.g., to 1 mm. Hg. It is recommended, furthermore, to use only a low gas-input-current. The desired operative condition can be adjusted by gradually increasing the pressure in the reaction space corresponding to the introduced quantity of gas and the distance to the counter-electrode so that, by adjusting the voltage source 30, the introduced electric energy is increased accordingly. If desired, the counter-electrode 37 may be disconnected from the voltage source 30 and connected to the also adjustable voltage source 43 at the beginning of the initial process or during the operation, by opening the switch 39 and closing the switch 41. Via the switches 45 and 46, a voltage can then be established between the counter-electrode 37 and the metal plate 22 or the metal sleeve 34. If, for instance, the counter-electrode is used as a plate electrode, the switch 36 can be opened so that the metal sleeve 34 is no longer connected to the current sources (also with the open switch 45), therefore serving as a static metal protection. The voltage sources 30 and 43 should be adjustable between 100 v. and 2000 v., preferably between 150 v. and 900 v.

Another embodiment of the present process is illustrated in FIG. 5. The jet 51 flowing through the outlet of the nozzle 50 is surrounded coaxially by a metal surface 52 designed as a ball shell. On the inside of the ball shell 52 lies an annular counter-electrode 53 which is insulated from the metal surface 52 and connected to the terminal 54. If a sufficient voltage is applied between the terminal 55 connected to the ball shell 52 and the terminal 54, the ball shell 52 being at least periodically negative, an electric glow seam is produced on the inside 56 of the said ball shell provided that a suitable gas pressure prevails in the reaction space beyond the jet 51. Because of the shape of the inside 56, the electrons emerging from the glow seam and, respectively, from the inside 56, are concentrated in a relatively small zone in the proximity of the jet 51, thus resulting in a marked increase of the electron density in this portion of the space. The nozzle 50 can be connected, via the terminal 57, to one of the terminals 54 or 55 or it may be supplied by an own voltage source. If so desired, the ball shell 52, together with the counter-electrode 53, may be slid along the jet 51. The nozzle 50 is shown only diagrammatically and may be designed according to any of the embodiments illustrated in FIGS. 3 and 7.

Figure 6:
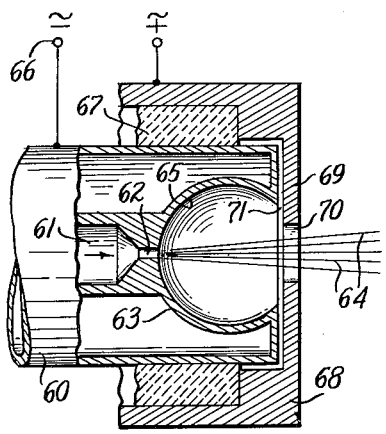

The design of the device according to FIG 6 is based on the principle of focusing the electrons to a limited zone of the jet, as shown by FIG. 5. The cylindrical metal body 60 is provided with an input member 61 with a nozzle opening 62. This opening 62 continues into a ball-shaped enlargement 63 which, in the direction of the nozzle axis, is provided with an aperture for the jet 64. The ball-shaped inner partition 65 of the enlargement 63 thus formed carries a glow skin if, at least periodically, a sufficiently large negative voltage is applied, via the contact 66, to the metal body 60. This results in focusing to a limited zone near the jet axis of the electrons generated in this glow skin, or at the metal surface 65 respectively.

The cylindrical metal body 60 carries an insulating ring 67 supporting a metal sleeve 68, which is designed with an overlapping flange 69 with an opening 70 in coaxial position to the direction of the jet. Between the outside of the metal body 60 and the inside of the metal parts 68, 69 lies a protective gap 71 for which the same principles are to be observed as are applied to the protective gap 35 in FIG. 3.

Figure 7:
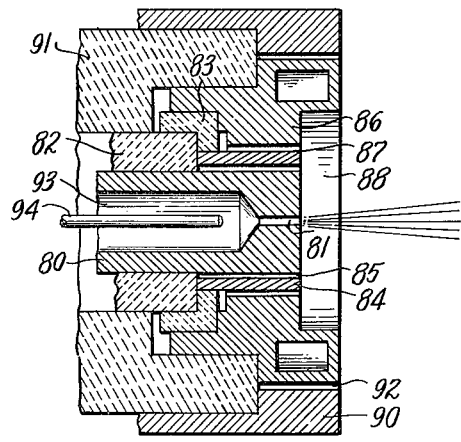

A particularly advantageous design of the device according to FIGS. 3 and 4 is shown in FIG. 7. The nozzle 80, with the mouth 81, carries the insulating rings 82 and 83, which support a metallic intermediate ring 84 coaxially with the nozzle 80 in such a manner that this intermediate ring forms, with the nozzle, an annular neutral gap 85. The intermediate ring 84 is in turn enclosed by a metal bush 86 supported by the insulating ring 83 and forming, together with the intermediate ring 84, an outer neutral gap 87. This bush 86 carries the edge 88 on which, during the operation, a glow skin is produced in order to generate a current of electrons directed concentrically to the jet axis. The edge 88 is coolable by a cooling medium introduced via the hollow space 89. The edge 88 may be surrounded on its outside by a metal sleeve 90 lying on an insulating piece 91 and, together with the edge 88, forms a protective gap 92.

In operation, a negative potential must be at least periodically applied to the metal bush 86 and the edge 88, whereas negative or positive potential may be applied to the nozzle 81 if it is made of metal, but it can also be operated without any connection to the voltage sources and, if so desired, be made of non-conducting or poorly-conducting material. The metallic intermediate ring 84 serves as a static protective device and prevents the glow discharge from penetrating into the annular neutrtal gaps 85 and 87. The metal sleeve 90 which, if so desired, can be cooled, may carry at least periodically a positive potential or it may be connected to the reaction receptacle.

Finally, it may be pointed out that, for the application of this process, the inlet members diagrammatically shown in FIGS. 1 through 7 need not necessarily be provided with only one nozzle opening each. The devices as shown in FIGS. 1 and 5 permit, on the contrary, the introduction of more than one jet into the reaction recipient when instead of the nozzle openings 21, 62 and 81, as shown in the embodiments of FIGS. 3, 6, 7 respectively, a nozzle with several bores, each one close to the other, is employed.

Figure 8:
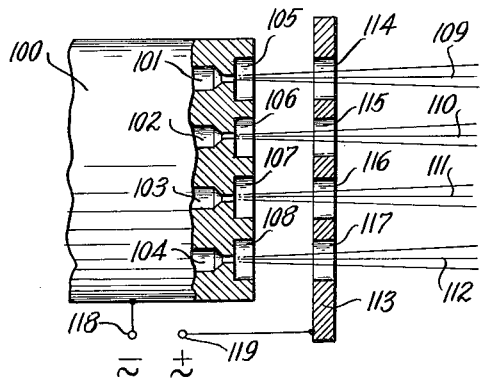
FIG. 8 shows an embodiment with several inlet members.

A device with several nozzles is shown for instance in FIG. 8, where the metal body 100 is provided with several nozzle bores 101, 102, 103 and 104 with parallel axes leading each into a cylindrical trough 105, 106, 107 and 108 respectively, whose inside surrounding the jet axis concentrically is intended to produce a glow skin during operation. The emerging jets 109, 110, 111 and 112 respectively pass through a metal plate 113, each having a concentric aperture 114, 115, 116 and 117 respectively per jet. If a negative voltage is applied at least periodically to the metal body 100, via the terminal 118, and if a positive voltage is applied at least periodically, via the terminal 119, each jet stays under the action of the electric field between the counter-electrode 113 and the nozzle body 100, but, after the emission from the corresponding nozzle opening, it will immediately be under the action of the electron current emerging from the inside of the troughs 105, 106, 108 respectively which surrounds the jet concentrically. But here, too, the counter-electrode 113 may be designed so as to be slidable along the jet axis.

As specified above, the nozzle bodies need not necessarily be made of metal in all embodiments, but they may also consist of an insulating material such as ceramics and china or hard material such as bornitride, or additionally of semi-conductors, e.g. germanium, silicon, or of metal/non-metal sinter bodies. With the embodiment shown in FIG. 5 or 6, the counter-electrode 53 or the sleeve 68, 69 respectively may be made of a semi-conducting material. Such structural parts made of a non-conducting or semi-conducting material may be advantageous in particular with aggressive reacting substances or end products. There is also a possibility of covering some structural parts, even energized parts, by a very thin, but non-porous, layer of an insulating material, for instance silicone lacquer, experience having revealed that this method does not entirely stop the discharge.

With this process it has been shown that pre-ionisation is advantageous for many reacting substances. It has to take place before the reacting substances leave the nozzle openings and enter the reaction space. As indicated in FIG. 7, such pre-ionisation may for instance take place in an antechamber 93 placed immediately in front of the nozzle bore 81 in the nozzle body 80. If a sufficiently strong voltage is applied between the metal contact 94 and the metal wall 80, of between about 200 v. and 1000 v., and if a corresponding pressure of the gaseous or vaporous reacting substances flowing through the antechamber is maintained, then an electric glow discharge occurs, thus causing a pre-ionisation of the reacting substances.

For simplicity, the reaction container for the embodiments shown by FIGS. 3 through 8 has been omitted from the drawings. But it may be pointed out that the devices shown by FIGS. 3, 5, 6, and 7, similar to the nozzle 10 in FIG. 1, are designed as inlet members leading into the reaction recipient which may consist of a conducting or non-conducting material. This recipient may be a tube or a vessel. It is possible to mount several similar inlet members in the same reaction recipient.

Figure 9:
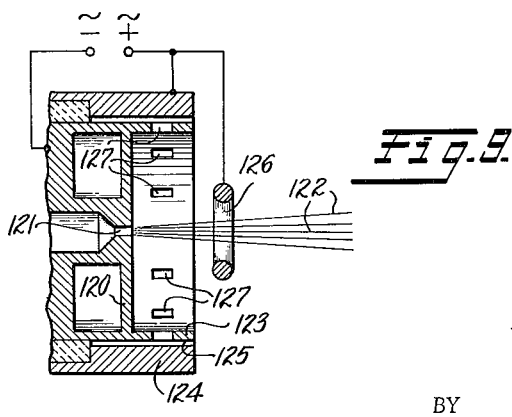
FIG. 9 shows an embodiment with two counter-electrodes.

FIG. 9 shows an embodiment resembling that of FIG. 3 which consists, for instance, of a front surface 120, provided with a negative potential, with a central nozzle bore 121 for the formation of the jet 122, and with a protruding cylindrical edge 123 which, on its outside, is surrounded by the sleeve 124, therewith forming a narrow annular protective gap 125. The sleeve 124 as well as an annular counter-electrode 126 are provided, for instance, with a positive potential. The ring 123 shows breaches 127 enabling the anode sleeve 124 to pass through to the inner cathode surface of the edge 123 and to maintain therewith more easily a glow discharge, in particular with high pressures. There are, therefore, two anodes 124 and 126, one of which, namely 124, is turned toward the cathode surface of the ring 123, i.e. it lies in its proximity so that a glow discharge is preferably obtained at this point. The same action may be obtained by means of two annular anodes, for instance by an embodiment according to FIG. 7. One of the two anodes is designed with a relatively large diameter and turned towards the edge 88, i.e. it lies in the proximity of the inner surface of the edge, while the other anode is arranged in a jet-downward-position and has a smaller opening diameter. Such a design with two anodes has revealed that this second anode, lying in a jet-downward-position coaxially with the jet must be adjustable according to its distance from the mouth of the nozzle-like opening, since the yield of the desired end product may be influenced by this distance. It is also of importance that the anodes can be centred opposite to the jet axis and be radially adjustable.

With this process it may be particularly important, as already described in connection with FIG. 8, that the whole quantity of substances to be put in is not introduced in one single jet, but distributed in several jets. Then the total cross-section of the nozzle-like input member 10, which is measured according to the desired throughput quantity, will be subdivided into several individual cross-sections. Therewith arises the arrangement of a multiple nozzle. This expression designates also forms of nozzles as shown in FIGS. 17 through 19. An embodiment of a suitable multiple nozzle is shown in FIGS. 10 and 11.

A cylindrical tube 140 having a front wall 142 with five nozzle-like bores 141 is arranged as a closure. The axis of the jets 143 produced by the nozzle bores 141 diverge in an approximately parallel direction. Such a multiple nozzle with the radius $r_1$ of the same bores 141 furnishes nearly the same throughput quantity as a circular nozzle with only one bore of a radius $(r_2)^2 = 5(r_1)^2$.

Instead of a parallel jet axis, a multiple nozzle may be designed for converging jet axis, as shown in FIG. 12. The front wall 145, provided with nozzle bores 144 of the tube 146 is curved and the central axes 147 of the nozzle-like bores 144 converge to a point 148 on the inside of the reaction space.

An embodiment of a multiple nozzle with diverging jet axis is shown in FIGS. 13 and 14. The inlet tube 150, with a front wall 151, is closed by a radially protruding edge 152, which is provided with a multitude of nozzle-like radial bores 153 connected with the inner space of the tube 154.

Another embodiment of a multiple nozzle with radially diverging jet axis is shown in FIGS. 15 and 16. A flat inlet channel 155 is closed at the end by a semi-circular front wall 156 provided with three flat gap-like openings 157, which are in connection with the inner space 158 of the inlet channel.

The distribution of the cross-section of the nozzle-like inlet member has for its object to have the quantity of substances, according to the desired throughput—for instance a gas or a vapour—introduced not in a single thick jet, but in a multitude of individual thinner jets. This measure is, on the one hand, advantageous because, naturally, the sojourn time of the reacting substance or substances introduced by the way of jets can be maintained more accurately within certain desired limits if introduced in a multitude of individual thinner jets than if introduced in one single thicker jet. This is easily understandable for instance with multiple nozzles with parallel or diverging single jets because the extension takes place undisturbed within the reaction space, entirely or at least along a portion of their path, and the sojourn time of a gas particle within the individual jet is shorter and may be predetermined more accurately than with a thicker single jet. On the other hand, a multitude of individual thinner jets is particularly advantageous if, from the periphery, the jets are enriched with charge carriers which have, within the jets, only a limited range of action owing to their absorption.

If desired, the necessary total cross-section of the nozzle-like inlet member may be distributed in such a way as indicated in FIGS. 17, 18, 19, and 20, perhaps by radial transverse walls 160, as in FIG. 17, by gap openings 161 and 162 crossing each other, as in FIG. 18, by parallel gaps 163, 164, 165, 166, as in FIG. 19 or also by annular gaps, as in FIG. 20.

The embodiment with reference to FIGS. 20 and 21 shows a multiple nozzle so arranged as to enrich the gas jet 171 leaving by the annular gap 170 with electrons which, emerging from the inner wall 172 of the metal edge 173 which surrounds the jet 171 coaxially, fly radially inwards to the jet. The metal edge 173 is a part of the nozzle body 174, respectively of its plate-like front walls 175. The nozzle body 174 has the inlet channel 176 for the reacting substances. It is connected with the nozzle-like annular gap 170. It also shows hollow spaces 177 for the passage of a cooling medium current. The nozzle body 174 is made of metal and connected, via the contact 178, to the at least periodically negative pole of a voltage source, the other pole thereof lying, with the contact 179, on a ring electrode 180, arranged in a jet-downward-direction, before the front wall 175, and in a coaxial position to the jet 171. In operation, an intense electric glow discharge is produced on the inside 172 of the edge 173, provided that the distance of the ring electrode 180 from the front wall 175 and the edge 173 is suitably chosen and that the nozzle body 174 carries a negative potential in relation to the ring electrode 180. From the glow skin formed and from the inner partition 172, electrons are emitted in the direction towards the jet 171, penetrating the jet and dissociating the reacting substances or influencing them in another way. Since at least a part absorption of the electrons occurs, the width of the annular gap 170 is measured according to the time of the prevailing range of action of the electrons.

The embodiment of a multiple nozzle, so arranged that the jets can be loaded, from the periphery, as indicated in FIGS. 22 and 23, has its front wall 185 of the inlet tube 186 provided with four nozzle-like bores 187, each being arranged in a cylindrical trough 188. The front wall 185 is coolable by the hollow spaces 189. Negative potential is at least periodically applied to the front wall 185, via the contact 190. The electrode plate 194 carrying an opening 193 which is arranged concentrically to the individual jets 192, receives, at least periodically, a positive potential applied to via the contact 191.

Hereby also, a glow seam is formed at the cylindrical inner partitions 195 of the troughs 188 which produces electron currents wandering radially to the jet axis and penetrating the individual jets 192. The diameter of the bores 187, i.e. the thickness of the jet to be produced, can thereby be calculated in relation to the penetration power of the generated charge carriers.

The most suitable thickness of the individual jets, such as shown in the embodiment in FIGS. 22, 23, is naturally dependent upon the gas density in the jet itself and the penetrating capacity of the charge carrier associating with the jet. Thicknesses between 1 mm. and 10 mm., preferably between 1 mm. and 5 mm., have proved to be useful. With the formation of the cross-section or the individual cross-sections, it is to be considered that the velocity of the jet ought to be, at least right at the nozzle mouth, one hundredth of the speed of sound. In most cases, however, jet velocities up to a multiple of the speed of sound are desired, owing to the efforts being made to reduce the sojourn time. These velocities may be attained if the right nozzles are used, such as the Laval nozzles. The pressure in the reaction space 11 (FIG. 1) is chosen for relation to the desired jet velocity and the passage time of the reacting substances through the active jet zones; but it lies, however, mostly above 0.5 mm. Hg. The operating voltage lies within a range of 150 to 2000 v., preferably from 200 to 900 v.

Another example of a multiple nozzle is shown in FIGS. 24 and 25. Arranged in an outer tube 200 is a second tube 201 of a smaller diameter which is provided with a multitude of nozzle-like bores 204 in its wall. The inner tube 201 forms a ring channel 202 with the outer tube 200, serving as the inlet of one or several reacting substances, for instance a gas mixture which is introduced, via the nozzles 204, into the inside 203 of the tube 201 in the form of radially directed jets 205. One or several reacting substances or an auxiliary gas may be blown also in the direction of the arrow 206 through the inner space 203 and they may serve at the same time for the emission of the reaction products. As a counter-electrode there may be provided a metal rod having a positive potential in relation to the tube 201 which is arranged along the central axis (not shown). Then an electric glow discharge is produced on the inside of the tube as well as an electron current in the direction of the tube axis. If desired, each one of the nozzle-like bores 204 on the inside of the tube 201 may be provided with a trough such as the cavity 188 at the bores 187 of the multiple nozzle shown in FIGS. 22 and 23.

I claim:
1. Apparatus for carrying out chemical reactions between gaseous, vaporous, and finely dispersed fluid and solid substances, comprising a reaction receptacle with at least one nozzle for supplying the reacting substances in the form of a jet, at least one outlet member for the reaction products, at least one insulated electrode projecting into the reaction receptacle with at least one metallic surface arranged substantially concentrically with the axis of the jet discharged by the nozzle and at least partially surrounding the same, a counter-electrode, a source of voltage arranged between the electrode and its counter-electrode and operative to provide the first-mentioned electrode at least periodically with a negative voltage with reference to its counter-electrode, said voltage being of such magnitude that corpuscular rays are directed by the electrode upon the nozzle jet.

2. Apparatus as claimed in claim 1, comprising a metal supply member with a plate-shaped front turned towards the reaction space and having a central nozzle bore and an edge overlapping the front side and coaxial with the nozzle bore, a metal sleeve forming the outer shell of the supply member and electrically insulated from the front side and its edge and forming an annular protective gap with the outside surface of the edge.

3. Apparatus as claimed in claim 2, characterized by passage openings at the edge.

4. Apparatus as claimed in claim 2, including at least one annular counter-electrode arranged coaxially with the axis of the nozzle bore and surrounding the same.

5. Apparatus for carrying out chemical reactions between gases comprising a cylindrical nozzle body having a flat front surface provided with a central nozzle bore turned towards the reaction space, a metallic intermediate ring surrounding the cylindrical front part of the nozzle body and electrically insulated therefrom, said ring forming an annular inner neutral gap, a metal bush provided with an edge overlapping the front surface of the nozzle body and surrounding the intermediate ring concentrically, said bush being electrically insulated from and forming with the intermediate ring an outer neutral gap, and a metal sleeve wholly surrounding the outside of the metal bush and edge, said sleeve being electrically insulated from the metal bush and forming therewith an annular protective gap.

6. Apparatus as claimed in claim 1, characterized by the fact that at least one of the structural energized parts is made of a semiconducting material.

7. Apparatus as claimed in claim 1, including a multiple nozzle with individual bores whose longitudinal axes intersect one another at a point in the inside of the reaction receptacle.

8. Apparatus as claimed in claim 1, characterized by at least one gap-shaped opening serving as a nozzle.

9. Apparatus as claimed in claim 1 characterized by an annular gap serving as a nozzle.

10. Apparatus as claimed in claim 1, wherein the reaction receptacle is tube-shaped, and a plurality of nozzle supply members directed radially toward the central axis of the tube.

References Cited in the file of this patent

UNITED STATES PATENTS

| | | |
|---|---|---|
| 1,051,120 | VonKoch | Jan. 21, 1913 |
| 2,583,898 | Smith | Jan. 29, 1952 |
| 2,837,654 | Berghaus et al. | June 3, 1958 |
| 2,916,534 | Schallus et al. | Dec. 8, 1959 |

FOREIGN PATENTS

| | | |
|---|---|---|
| 421,811 | Great Britain | Dec. 20, 1934 |
| 441,921 | Great Britain | Jan. 27, 1936 |
| 502,063 | Great Britain | Mar. 10, 1939 |